Oct. 5, 1965  W. VOIGT  3,209,399
APPARATUS FOR SHIRRING SAUSAGE CASINGS
Filed Jan. 19, 1962  2 Sheets-Sheet 1

INVENTOR
WILHELM VOIGT

BY *James E. Bryan*
ATTORNEY

Oct. 5, 1965 W. VOIGT 3,209,399
APPARATUS FOR SHIRRING SAUSAGE CASINGS
Filed Jan. 19, 1962 2 Sheets-Sheet 2

INVENTOR
WILHELM VOIGT

BY James E. Bryan
ATTORNEY

United States Patent Office 3,209,399
Patented Oct. 5, 1965

3,209,399
APPARATUS FOR SHIRRING SAUSAGE CASINGS
Wilhelm Voigt, Wiesbaden-Biebrich, Germany, assignor to Kalle Aktiengesellschaft, Wiesbaden-Biebrich, Germany
Filed Jan. 19, 1962, Ser. No. 168,030
Claims priority, application Germany, Jan. 21, 1961, K 42,693
5 Claims. (Cl. 17—42)

This invention relates to an apparatus for shirring sausage casings.

It is known to shirr thin sausage casings, i.e., to gather them in the longitudinal direction in concertina form, so that they are easier to handle during the making of the sausage. The shirring of the sausage casings has been effected, for example, by means of pushing devices which push the casing, drawn over a mandrel, inflated with air if required and supported at one end, against the support. In this process, the pushing devices first press the casing simultaneously in pairs or alternately in succession in the direction of the centre of the casing before moving it longitudinally to shirr it. The common feature of all these methods is that the deformation and compression forces required for shirring the casing must be applied by frictional contact between the casing and the shirring means. The magnitude of this frictional contact is indefinite and the maximum thereof is relatively closely limited, since it depends on the surface properties of the casing and of the shirring means. If the resistance of the sausage casing to shirring exceeds the frictional force, slipping of the pushing devices on the sausage casing takes place and the chafing action thus occuring may weaken or damage the casing or cause wear of the pushing devices.

The present invention provides an apparatus for shirring sausage casings, wherein a sausage casing on a mandrel is subjected to radial outward suction and is shirred by longitudinal transposition by movement of the suction means while the casing is suctioned on to it.

Advantageously suction is applied intermittently and alternately at opposite sides of the mandrel axis. The abovementioned disadvantages are thereby obviated.

The invention also provides an apparatus including a mandrel and two rollers rotatable in opposite directions on parallel axes perpendicular to the mandrel axis with the mandrel between and equally spaced from them, each roller having equiangularly spaced peripheral suction chambers alternately arranged for alternate opposite engagement of a sausage casing by suction, and means for applying suction to said chambers over a particular angle of movement of the rollers corresponding to the shirring path of the sausage casing.

Advantageously the peripheries of the rollers are grooved to provide limiting guides for the shirred casing. Preferably each suction chamber is provided with a sieve plate to limit the penetration of the casing into the chamber under the suction, and the mandrel is hollow and means are provided for passing air through it into the casing.

An apparatus according to the invention is illustrated by way of example in the accompanying drawings in which.

Figure 1:
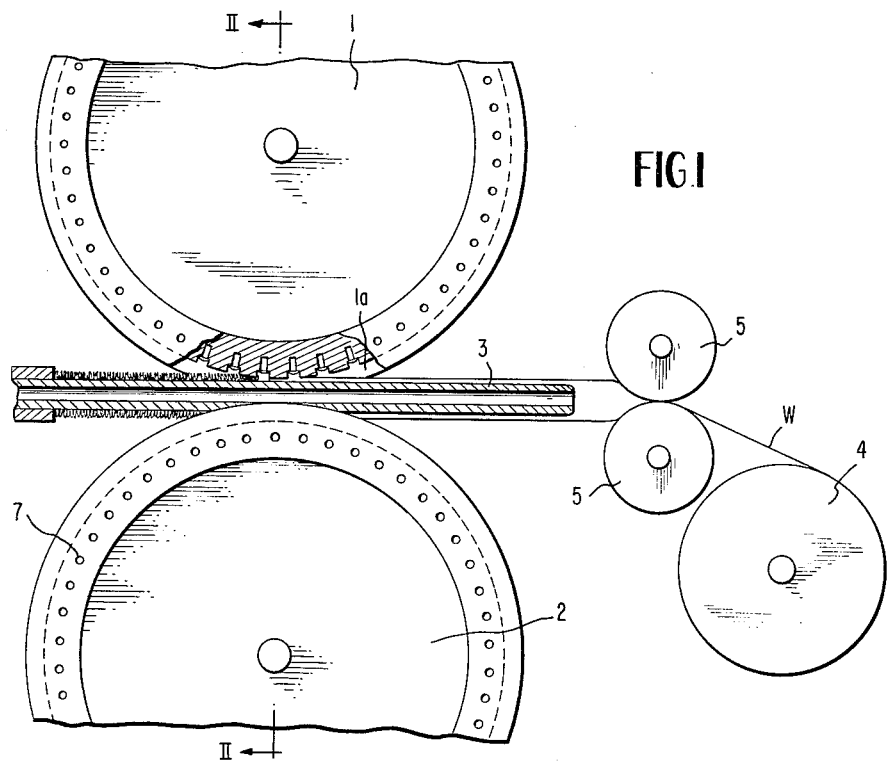
FIG. 1 is an elevation, partly in section.
Figure 2:
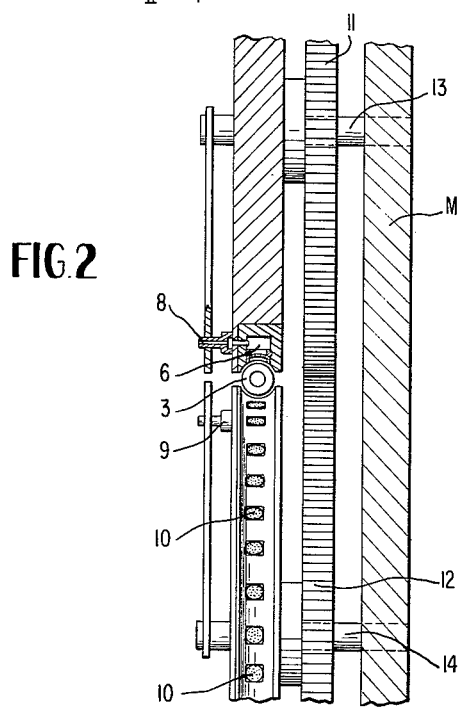
FIG. 2 is a part elevation, part section on the line II—II of FIG. 1.

Referring to the drawings, the apparatus comprises two rollers or drums 1 and 2 arranged closely one above the other, which are coupled for rotation in opposite directions about shafts 13 and 14, respectively, mounted on a mounting plate M. It is generally advantageous to groove the rollers 1 and 2 somewhat at the periphery in order to provide a limiting guide surface corresponding approximately to the shape of the shirred sausage casing. However, it is not advisable to adapt the passage between the two rollers exactly to the cross-section of the sausage casing, but the passage is preferably somewhat larger than said cross-section so that no unnecessary friction occurs between the casing and the roller. The rollers 1 and 2 assist in the manner described below in the conveyance of the sausage casing W to be shirred on a hollow mandrel 3. The sausage casing to be shirred may be wound in known manner on a roller 4 and be drawn off by means of a pair of driven nip rollers 5 and pushed onto the mandrel 3. The pair of rollers 5 forms at the same time a seal for air which is blown at a pressure slightly in excess of atmospheric into the sausage casing through the mandrel 3, in order to expand said casing and thereby facilitate the shirring thereof.

Suction chambers 6 are located in the periphery of the rollers 1 and 2, with openings in the surfaces 1a and 2a respectively, for engaging the sausage casing to be shirred. To each of the suction chambers 6 there is connected a duct in the form of an angular bore 7 having a radially directed portion 7a, which opens into the chamber, and an axially directed portion 7b, which opens at one side face of the rollers 1 and 2. A transmission system for connecting the suction chambers successively to a vacuum vessel is relatively simply constructed, the lateral openings of the chamber ducts being drilled at the same distance from the central axis and suction heads 8 and 9, respectively, being so mounted that, as the rollers rotate, the corresponding suction head slides on that side face thereof at which the ducts 7 of the chambers open and comes into register with each of these openings in succession. The suction head is connected to a vacuum vessel by an air pipe. The side face of the roller and the suction head are advantageously finished by grinding in order to obtain the necessary air-tightness.

The suction chambers 6 may be provided at the base with a sieve plate 10 in order to provide a limiting surface for that part of the sausage casing which is sucked into the chamber. The form of the crease given to the sausage casing shirred by means of the apparatus can be controlled to a certain extent by the position of the sieve plate 10 in the chamber 6. Satisfactory shirring of the casings is also obtained when the sieve plates are located directly at the periphery of the rollers and not inset as shown. Owing to the absence of re-entrant edges at the limiting surface for the sausage casings, this method of design renders possible a particularly advantageous transport of these casings. The suction chambers 6 are advantageously arranged on the two rollers 1 and 2 so that they are distributed at equal angular spacing over the peripheries of said rollers and the two rollers are so adjusted in relation to one another that, at the place where the surfaces of the two rollers approach closest to each other, a suction chamber on one roller encounters in each instance the intermediate space between two suction chambers on the other roller. The positions of the rollers in relation to one another are then positively controlled, for example by coupling the two rollers 1 and 2 by means of the gear wheels 11 and 12 rotating with them about the same shafts 13 and 14, respectively, and fixed to said rollers.

The suction heads 8 and 9 may be arranged adjustably in such a manner that they can be swung about the axes of the rollers and fixed in a new position. In this way, the place where the suction chambers 6 are connected to, or disconnected from, the vacuum vessel can be varied. The size of the suction heads 8 and 9 determines the duration of the suction period of the suction chambers.

Figure 3:
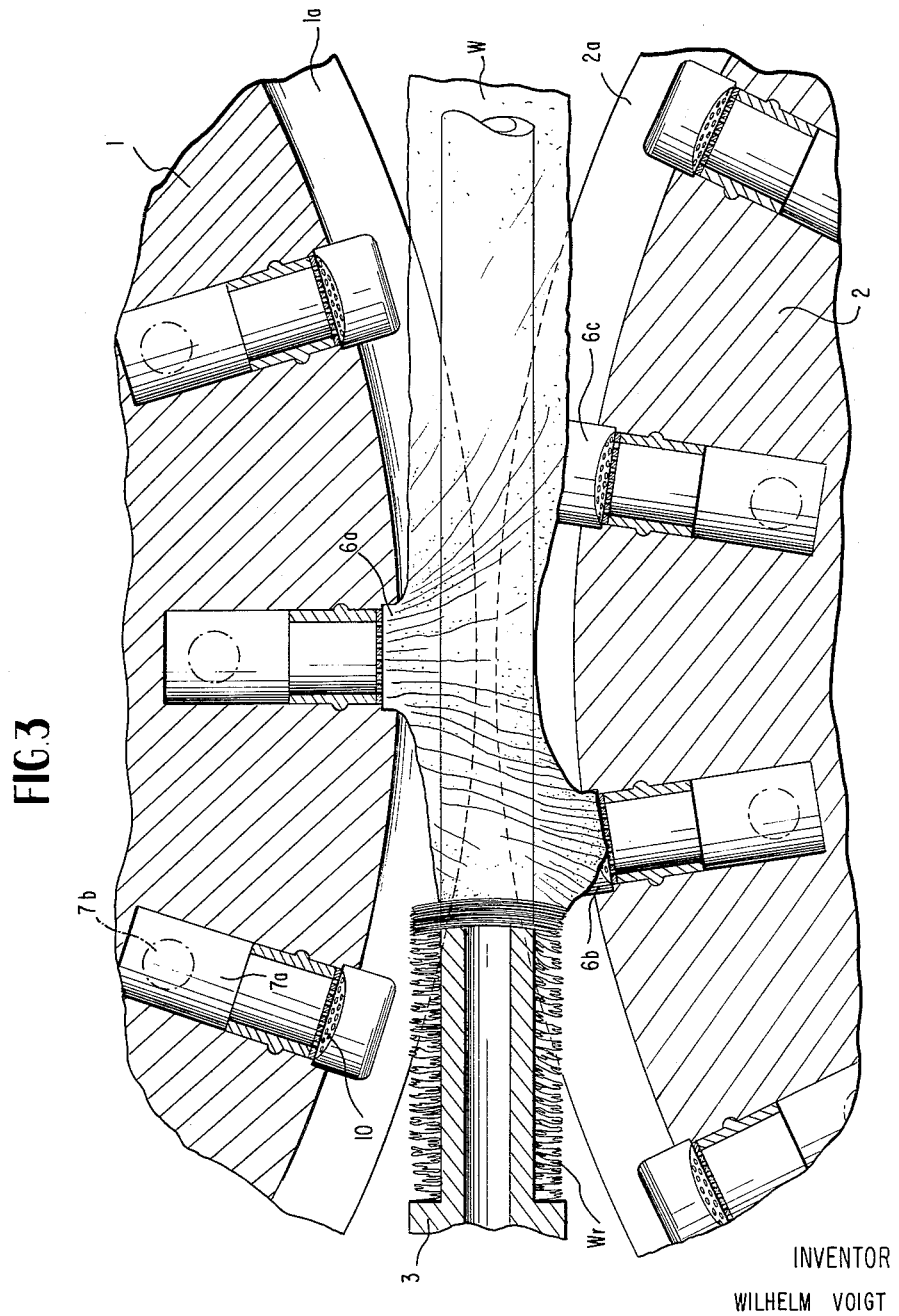
FIG. 3 is a much enlarged fragment, mainly in section, viewed similarly to FIG. 1.

FIG. 3 illustrates the course of the shirring process. The upper roller 1 moves clockwise and the lower roller 2 in the opposite direction. The sausage casing W to be shirred is led between the two rollers through the grooves 1a and 2a, respectively, conveyed to the left and compressed to form the shirred sausage casing Wr. In the upper creasing roller 1 a suction chamber 6a is at the point of maximum approach to the other roller; in the arrangement illustrated, this is at the same time the lowest position of said suction chamber 6a. In this position, it is in communication with a vacuum vessel through the suction head 8, which is not illustrated in FIG. 3. It therefore sucks up that side of the sausage casing which is in front of it and draws it against its wall and against the sieve 10. The casing which is inflated at a pressure slightly in excess of atmospheric, is thereby displaced upwardly and eccentrically with respect to the mandrel 3, retained by the suction effect and pushed to the left by the roller 1, which continues to rotate. The same process has taken place a short time before in the opposite direction in the case of the suction chamber 6b located in the lower roller 2, which chamber leads the suction chamber 6a by half the angular spacing of the interval between the suction chambers. The suction chamber 6b is located a short distance in front of the place where the compression proper of the sausage casing pushed towards the left takes place. At this point, it is cut off from the vacuum vessel and therefore releases the previously sucked-up sausage casing, which is now pushed further to the left owing to the sucking action of the roller 1 accompanied by eccentric displacement upwardly and is subjected to compression. Only a little later, the suction chamber 6c located in the lower roller which follows the suction chamber 6b, is connected to the vacuum vessel, whereby the sausage casing again undergoes an eccentric displacement downwardly.

In the method carried out by the apparatus of the invention, transmission of the movement of the pushing devices to the sausage casing is obtained by sucking up of the sausage casings. This method of shirring results in less wear of the material and, as regards the force applied, point of time and duration of the action, can be more satisfactorily regulated than the transmission of movement by engagement by friction employed in the methods heretofore known for shirring sausage casings and effected by means of compression devices pressed onto the sausage casing.

What is claimed is:

1. An apparatus for shirring sausage casings comprising a mandrel, a pair of rolls mounted adjacent the mandrel and on opposite sides thereof, suction chambers substantially uniformly spaced around the peripheries of the rolls, means for rotating the rolls and means for actuating the suction chambers, whereby a sausage casing is advanced on the mandrel and shirred.

2. An apparatus according to claim 1 in which the rolls form a channel about the mandrel.

3. An apparatus according to claim 2 in which the suction chambers are relatively spaced so that the suction chambers on one roll act alternately with the suction chambers on the other roll.

4. An apparatus according to claim 1 including means for inflating a sausage casing on the mandrel.

5. An apparatus according to claim 1 in which means are provided for intermittently actuating the suction chambers.

References Cited by the Examiner

UNITED STATES PATENTS

| | | | |
|---|---|---|---|
| 1,059,411 | 4/13 | Unversaw et al. | 17—42 |
| 2,030,744 | 2/36 | Clark | 226—95 |
| 2,670,498 | 3/54 | Mosby | 17—1 |
| 2,722,715 | 11/55 | Blizzard et al. | 17—45 |
| 2,819,488 | 1/58 | Gimbel | 17—42 |
| 2,983,949 | 5/61 | Matecki | 17—42 |
| 3,023,452 | 3/62 | James et al. | 17—1 |
| 3,097,393 | 7/63 | Matecki | 17—45 |

SAMUEL KOREN, *Primary Examiner.*

LUCIE H. LAUDENSLAGER, *Examiner.*